United States Patent [19]

Rynberk

[11] Patent Number: 5,649,386
[45] Date of Patent: Jul. 22, 1997

[54] POT FOR PLANTS AND ASSOCIATED SUPPORT

[75] Inventor: Robert W. Rynberk, Orland Park, Ill.

[73] Assignee: Valley View Specialties Co., Crestwood, Ill.

[21] Appl. No.: 533,247

[22] Filed: Sep. 25, 1995

[51] Int. Cl.⁶ .................. A01G 5/00; A47G 7/00
[52] U.S. Cl. .................. 47/41.14; 47/39; 47/71; 248/310
[58] Field of Search .................. 47/71, 39, 39 P, 47/39 C, 41.14; 248/310, 314, 311.2

[56] References Cited

U.S. PATENT DOCUMENTS

| | | |
|---|---|---|
| 385,174 | 6/1888 | Fahnestock ............... 47/39 C |
| 492,919 | 3/1893 | Gridley . | |
| 1,357,777 | 11/1920 | Hastings . | |
| 2,120,599 | 6/1938 | Brown . | |
| 2,452,236 | 10/1948 | Herzog .................... 47/39 C |
| 2,732,954 | 1/1956 | Janonis et al. ........... 47/39 C |
| 4,071,976 | 2/1978 | Chernewski ............... 47/39 |
| 4,092,804 | 6/1978 | Morris et al. ............. 47/71 |
| 4,167,080 | 9/1979 | Mickelson ................. 47/71 |
| 4,299,055 | 11/1981 | Dziewulski et al. ........ 47/71 |
| 4,442,629 | 4/1984 | Anderson ................... 47/71 |
| 4,481,733 | 11/1984 | Jacobs ...................... 47/66 |
| 4,553,352 | 11/1985 | Powell et al. .............. 47/71 |
| 5,220,744 | 6/1993 | Kendall .................... 47/39 C |
| 5,259,141 | 11/1993 | D'Alessandro ............. 47/39 |
| 5,269,095 | 12/1993 | Helfman et al. ............ 47/39 |

FOREIGN PATENT DOCUMENTS 8502285  3/1987  Netherlands ............... 47/71

Primary Examiner—Terry Lee Melius
Assistant Examiner—Joanne C. Downs
Attorney, Agent, or Firm—Rudnick & Wolfe

[57] ABSTRACT

An assembly of a pot for plants and an associated support wherein the pot defines a bottom wall and a surrounding side wall extending upwardly from the bottom wall. The support defines a horizontal surface upon which the bottom wall of the pot is positioned. Pin means extend upwardly from this horizontal surface, and at least one opening is defined by the bottom wall of the pot for receiving the pin means. This arrangement secures the pot on the support surface against the influence of wind, jostling, or other dislodging forces.

2 Claims, 2 Drawing Sheets

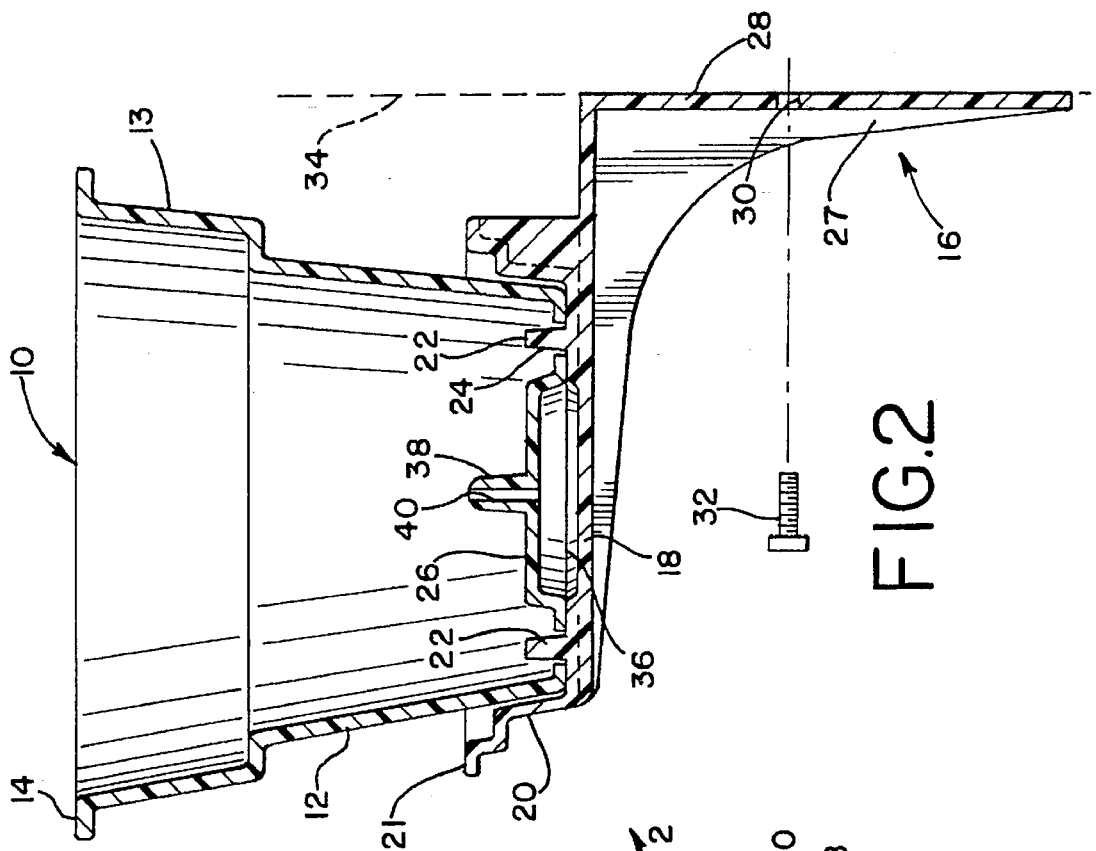
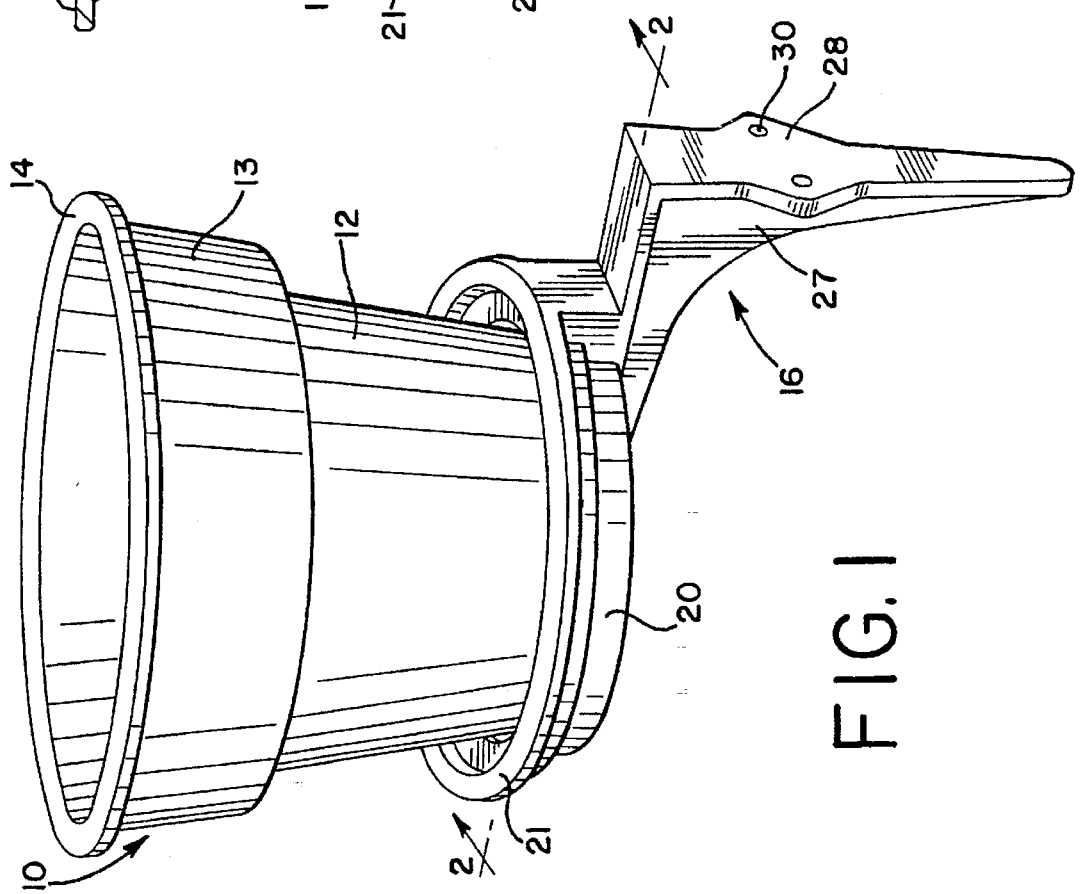

POT FOR PLANTS AND ASSOCIATED SUPPORT

BACKGROUND OF THE INVENTION

This invention relates to an assembly comprising a pot for flowers or other plants and an associated support. The invention particularly concerns an arrangement wherein it is desired that a decorative arrangement such as flowers be located on a wall and also in a position where the pot could be dislodged by the wind or some other force.

Various proposals have been made for supporting pots with plants in an elevated position, the most common being to simply rest the pots on top of a wall or ledge. It is well known, however, that such supports may be inadequate in windy times or where vibrations could shift a pot to a position where it would fall.

These problems are magnified where it is desired to support the pots on a wall surface or on the side of a post or the like. Brackets and holders of various types have been designed for this purpose, but none have been suitable from the standpoint of having a low cost but highly reliable construction.

SUMMARY OF THE INVENTION

The assembly of this invention comprises a pot for holding plants such as flowers in combination with a support for the pot. The pot is intended to be of conventional design comprising a bottom wall and a surrounding, upwardly extending and outwardly tapered side wall. The support defines a horizontal surface upon which the bottom wall of the pot is positioned.

In addition, pins are formed in the support, and the pins extend upwardly from the horizontal surface. Openings corresponding with the pin locations are defined by the bottom wall of the pot. When the pot is positioned on the bottom wall, the pins extend through these openings into the pot interior. The result is that the pot is confined against tilting relative to the support and will not be dislodged when exposed to windy conditions, vibrations, jostling, or similar forces.

A plurality of pins is preferably used for each support, and the pin arrangement is confined to the area adjacent the outer edge of the horizontal supporting surface. A rim is preferably defined by the support around this outer edge, and the pins are therefore located adjacent this rim. With this arrangement, a drain hole or holes typically centered in the pot may be retained without disrupting the pin function.

The support preferably includes an integrally formed bracket whereby the support can be attached to a wall or post. Preferably, the support and bracket, which may be a downwardly depending arm with openings to receive fasteners, are of a one-piece molded construction. Polyethylene is a preferred material, and the pot may also be molded of this material.

BRIEF DESCRIPTION OF THE DRAWINGS

FIG. 1 is a perspective view of a pot and support characterized by the features of this invention;

FIG. 2 is a vertical cross-sectional view of the pot and support; and

DESCRIPTION OF THE PREFERRED EMBODIMENTS

Figure 3:
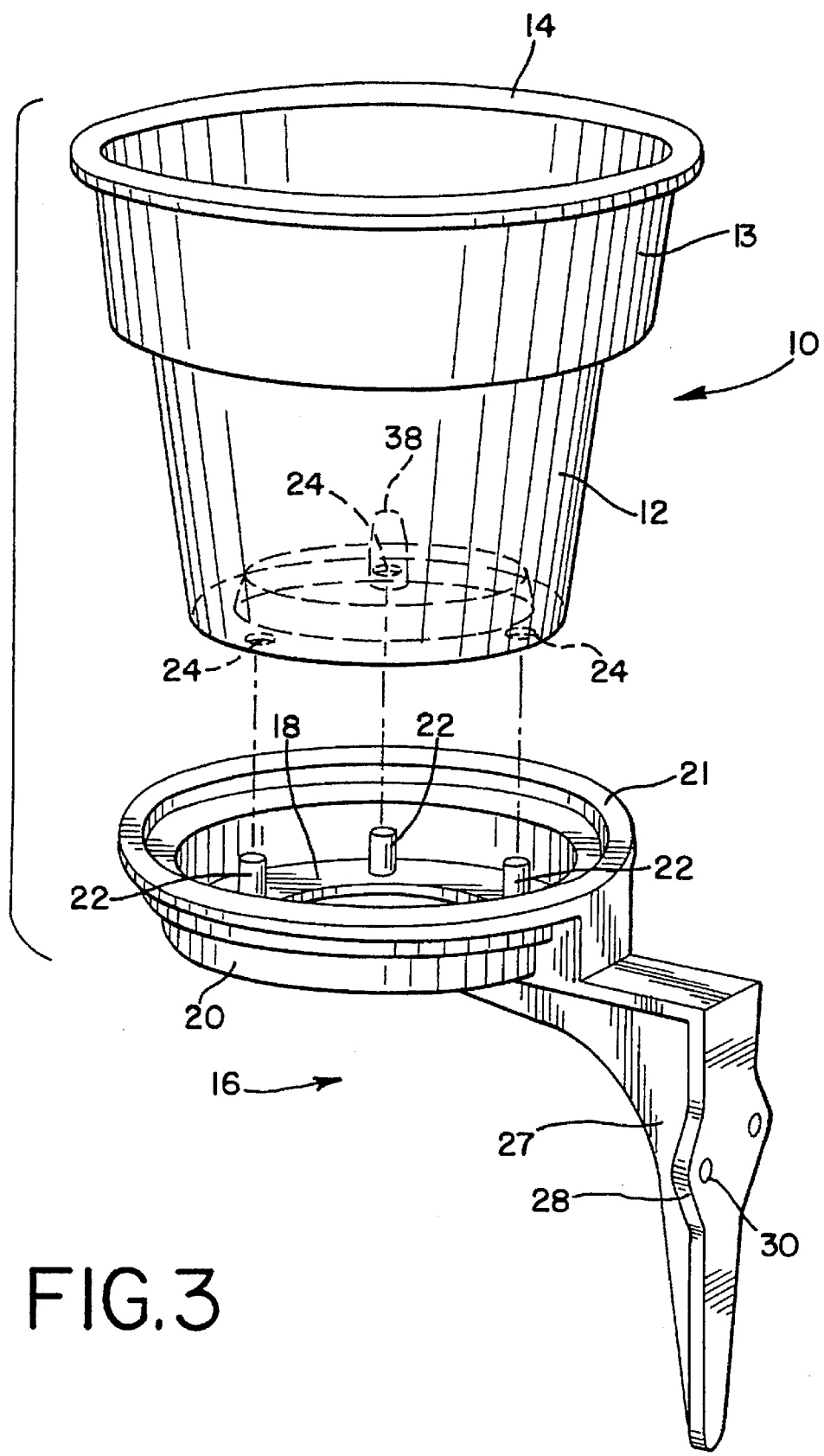
FIG. 3 is an exploded view of the pot and support.

The drawings illustrate pot 10 of conventional exterior shape. Specifically, the pot comprises an upwardly extending and outwardly tapered side wall 12, and a larger diameter portion 13 terminating at peripheral rim 14. A pot having a circular cross-section is shown, but any shape suitable for holding flowers or other types of plants, real or artificial, may be utilized.

Also shown is a support 16 consisting of bottom wall 18 and a side wall 20 terminating in rim 21 to form a dish shape. The bottom and side walls and rim are shaped and dimensioned for unconfined receipt of the pot 10, and it will be apparent that the shape of the support will vary where different pot shapes are utilized.

The support 16 has pins 22 extending upwardly from bottom wall 18. Openings 24 are defined by the bottom wall 26 of the pot 10, and these openings are adapted for alignment with and receipt of the pins 22.

The support 16 is also provided with a downwardly depending bracket arm 27 which includes wing portions 28. The wing portions define openings 30 which receive fasteners 32 so that the support can be attached to wall or post surface 34. Moly-type fasteners are preferred especially where brick or other hard wall surfaces are encountered.

Each of the pot 10 and support 16 comprises a one-piece molded part. Injection molding using polyethylene as the molding material is especially suited for making such shapes. Thus, pins 22 can, for example, be molded integrally with the dish and bracket arm portions of the support 16.

Similarly, injection molding serves to readily form pot 10 including the recessed area 36 and the upstanding post 38 formed in the center thereof. This post may include central opening 40 to assist in drainage from the pot to prevent moisture in the pot exceeding a desired level.

In the use of the assembly of the invention, the support 16 is first attached to a desired surface. The pot 10 may be placed thereon by aligning pins 22 with openings 24 and the flowers or other plants can then be placed therein. Alternatively, the planting may precede location of the pot since the pins will penetrate the soil in the pot when the pot is moved into position.

When the assembly is complete, the pot will readily withstand dislodging on a windy day since the pins 22, even though loosely received in the openings 24, will bind with the bottom wall of the pot and permit only the slightest tilting movement. Similarly, jostling or vibrations will not result in any significant sliding or tilting movement.

In preferred embodiments, pots with rim diameters of 6 inches or substantially greater are provided with openings 24 one-fourth to one inch in diameter. The diameters of pins 22 need be only slightly smaller to facilitate location of a pot on a support. Pins from one inch to two inches high achieve suitable results.

Three pins, spaced equilaterally over the bottom wall surface of support 16 have provided most satisfactory results. It will be appreciated, however, that different numbers of pins, including a single pin, can provide the desired binding effect and thereby achieve the desired stability.

It will be understood that various changes and modifications may be made in the above described invention, particularly as set forth in the following claims, without departing from the spirit thereof.

That which is claimed is:

1. An assembly of a pot for plants and an associated support wherein said pot defines a bottom wall and a surrounding side wall extending upwardly from the bottom wall, said support defining a horizontal surface upon which the bottom wall of the pot is positioned, said support comprising a dish consisting of said horizontal surface and a surrounding upstanding rim, pin means extending upwardly from said horizontal surface, and at least one opening defined by said bottom wall loosely receiving said pin means to secure said pot on said horizontal surface, and a bracket formed integrally with said support for attaching the assembly to a vertical supporting surface, said bracket comprising an arm extending downwardly from a side edge of said dish, and openings defined by said arm for receiving fasteners securing the bracket to said vertical supporting surface, said support including said bracket comprising a one-piece molded construction, and wherein said pot including said at least one opening comprises a one-piece molded construction, said pin means comprising three pins positioned adjacent said rim of said dish and spaced equilaterally from each other, the bottom wall of said pot defining a centrally located drain opening, and three additional openings positioned adjacent the side wall of the pot and spaced equilaterally from each other for receiving said pins, said additional openings being dimensioned to loosely receive the pins, said pot having a diameter of at least six inches, said openings being from one-fourth to one inch in diameter, and said pins being from one to two inches high, and wherein said arm of said bracket defines oppositely extending wing portions, the openings for receiving the fasteners being defined by the respective wing portions.

2. An assembly according to claim 1 wherein said pot and support are formed of polyethylene.

* * * * *